(12) United States Patent
Bataller et al.

(10) Patent No.: US 9,996,749 B2
(45) Date of Patent: *Jun. 12, 2018

(54) DETECTING CONTEXTUAL TRENDS IN DIGITAL VIDEO CONTENT

(71) Applicant: Accenture Global Solutions Limited, Dublin (IE)

(72) Inventors: Cyrille Bataller, Mougins (FR); Anders Astrom, villa marina (SG)

(73) Assignee: Accenture Global Solutions Limited, Dublin (IE)

( * ) Notice: Subject to any disclaimer, the term of this patent is extended or adjusted under 35 U.S.C. 154(b) by 83 days.

This patent is subject to a terminal disclaimer.

(21) Appl. No.: 15/167,576

(22) Filed: May 27, 2016

(65) Prior Publication Data

US 2016/0350596 A1 Dec. 1, 2016

Related U.S. Application Data

(60) Provisional application No. 62/167,930, filed on May 29, 2015.

(51) Int. Cl.
*G06K 9/00* (2006.01)
*G06F 17/30* (2006.01)
(Continued)

(52) U.S. Cl.
CPC ..... *G06K 9/00765* (2013.01); *G06F 17/3028* (2013.01); *G06K 9/00255* (2013.01);
(Continued)

(58) Field of Classification Search
USPC ....... 382/100, 103, 106–107, 155, 162, 168, 382/173, 181, 190, 209, 224, 232, 238,
(Continued)

(56) References Cited

U.S. PATENT DOCUMENTS 5,541,590 A 7/1996 Nishio
7,418,431 B1 * 8/2008 Nies ................. G06Q 10/06
702/2
(Continued)

FOREIGN PATENT DOCUMENTS

EP 2131328 12/2009
WO WO 2003/067884 8/2003
WO WO 2007/062044 5/2007

OTHER PUBLICATIONS

Australian Office Action in Application No. 2016203579, dated Jun. 22, 2016, 5 pages.
(Continued)

*Primary Examiner* — Seyed Azarian
(74) *Attorney, Agent, or Firm* — Fish & Richardson P.C.

(57) ABSTRACT

Computerized methods and systems, including computer programs encoded on a computer storage medium, may detect events shown within digital video content captured by one or more video cameras during a prior time period, and predict an occurrence of an additional event during a future time period based on time-varying patterns among the detected events. For example, a computing system may detect events shown within digital video content captured by one or more video cameras, and may establish a predictive model that identifies one or more time-varying patterns in event parameter values that characterize the detected events within the prior time period. Based on an outcome of the predictive model, the computing system may determine an expected value of one of the event parameters during the second time period.

18 Claims, 4 Drawing Sheets

(51) Int. Cl.

| | | |
|---|---|---|
| *H04N 7/18* | (2006.01) | |
| *G06T 15/20* | (2011.01) | |
| *G06T 19/00* | (2011.01) | |
| *G06K 9/62* | (2006.01) | |
| *G06T 7/00* | (2017.01) | |
| *G06T 7/80* | (2017.01) | |
| *G06T 7/73* | (2017.01) | |
| *G06T 7/13* | (2017.01) | |
| *G06T 7/292* | (2017.01) | |
| *G08B 13/196* | (2006.01) | |

(52) U.S. Cl.
 CPC ..... *G06K 9/00295* (2013.01); *G06K 9/00718* (2013.01); *G06K 9/00744* (2013.01); *G06K 9/00771* (2013.01); *G06K 9/00778* (2013.01); *G06K 9/6202* (2013.01); *G06K 9/6263* (2013.01); *G06T 7/0002* (2013.01); *G06T 7/13* (2017.01); *G06T 7/292* (2017.01); *G06T 7/75* (2017.01); *G06T 7/80* (2017.01); *G06T 15/205* (2013.01); *G06T 19/006* (2013.01); *H04N 7/18* (2013.01); *H04N 7/181* (2013.01); *G06K 2009/00738* (2013.01); *G06T 2207/10016* (2013.01); *G06T 2207/20061* (2013.01); *G06T 2207/30168* (2013.01); *G06T 2207/30201* (2013.01); *G06T 2207/30232* (2013.01); *G06T 2207/30242* (2013.01); *G08B 13/19602* (2013.01); *G08B 13/19608* (2013.01)

(58) Field of Classification Search
 USPC ....... 382/254, 274, 276, 286–295, 305, 312; 707/706; 340/540; 600/301; 702/2; 705/3
 See application file for complete search history.

(56) References Cited

U.S. PATENT DOCUMENTS

| | | | |
|---|---|---|---|
| 2007/0136102 A1* | 6/2007 | Rodgers | A61B 5/1113 |
| | | | 705/3 |
| 2008/0201116 A1 | 8/2008 | Ozdemir et al. | |
| 2010/0207762 A1 | 8/2010 | Lee et al. | |
| 2010/0299116 A1 | 11/2010 | Tomastik et al. | |
| 2011/0050864 A1 | 3/2011 | Bond | |
| 2011/0228092 A1 | 9/2011 | Park | |
| 2012/0044247 A1 | 2/2012 | Naimark | |
| 2012/0256745 A1* | 10/2012 | Piett | G06Q 30/02 |
| | | | 340/540 |
| 2013/0027561 A1 | 1/2013 | Lee et al. | |
| 2013/0054552 A1* | 2/2013 | Hawkins | G06N 99/005 |
| | | | 707/706 |
| 2013/0169749 A1 | 7/2013 | Zhou et al. | |
| 2014/0155705 A1* | 6/2014 | Papadopoulos | A61B 5/0022 |
| | | | 600/301 |
| 2015/0025329 A1* | 1/2015 | Amarasingham | G06F 19/3456 |
| | | | 600/301 |
| 2016/0034813 A1 | 2/2016 | Hsu et al. | |

OTHER PUBLICATIONS

Australian Office Action for Application No. 2016203571, dated Sep. 2, 2016, 4 pages.
European Extended Search Report for Application No. 16171901.8, dated Oct. 18, 2016, 10 pages.
Singapore Search Report for Application No. 10201604368T, dated Nov. 11, 2016, 5 pages.
Australian Office Action for Application No. 2016203571, dated Jan. 10, 2017, 2 pages.
Canadian Office Action for Application No. 2,931,743, dated Feb. 16, 2017, 4 pages.

\* cited by examiner

DETECTING CONTEXTUAL TRENDS IN DIGITAL VIDEO CONTENT

CROSS-REFERENCE TO RELATED APPLICATION

This application claims the benefit under 35 U.S.C. § 119(e) of U.S. Provisional Application No. 62/167,930, filed May 29, 2015, and titled "Video Analytics of Video Information," which is hereby incorporated by reference in its entirety.

TECHNICAL FIELD

This specification describes technologies related to video processing.

BACKGROUND

Modern organizations have widely adopted network-based video surveillance technologies, due in part to the decreasing cost of network components and increasing concerns regarding terrorism and crime. The rapid adoption of these technologies has resulted in a substantial rise in an amount of captured video content that is available for these organizations to monitor. Real-time monitoring of the large amounts of captured video content, however, is often unmanageable for many organizations. Therefore, some organizations have forgone real-time video content monitoring in favor of post-hoc analysis of video content for particular events, e.g., for forensic and evidentiary purposes.

SUMMARY

This specification generally describes computerized systems, processes, devices, and other techniques for detecting events shown within digital video content captured by one or more video cameras, and based on established time-varying trends or patterns, predicting an occurrence, or alternatively, a non-occurrence, of an additional event during a future time period. In this specification, an event corresponds to a presence or movement of a particular object, individual, or groups of objects or individuals within portions of the digital video content captured by the one or more video cameras.

For example, the computing system may store the digital video content captured by the one or more video cameras at corresponding geographic locations, and apply video analytics to portions of the stored digital video content to detect events shown within the digital video content at corresponding detection times. In other instances, the computing system may receive streaming video content from the one or more video cameras, and may apply the video analytics to portions of the streaming digital video content to detect events shown within the streaming digital video content at corresponding detection times, e.g., prior to or without storing the streaming digital video content. These detected events may be associated with values of event parameter, e.g., event parameter values, which characterize each of the detected events at corresponding detection times during a first time period. Further, through an application of one or more machine learning algorithms and/or data mining algorithms, the computing system may establish an existence of one or more patterns within the time-varying event parameter values, and generate a model that predicts an expected value of an event parameter that characterizes an additional event during the future time period. The expected event parameter value may be provided to one or more communications devices for presentation within corresponding interfaces, such as graphical user interfaces (GUIs) and voice-user interfaces (VUIs)

In one implementation, a system may include one or more computers; and one or more storage devices storing instructions that are operable, when executed by the one or more computers, to cause the one or more computers to perform operations comprising detecting events shown within digital video content captured by one or more video cameras The detected events may be associated with corresponding event parameters and detection times within a first time period, and the one or more computers may further perform the operation of applying a predictive model to values of the event parameters. In some aspects, the predictive model may identify a time-varying pattern in the detected events within the first time period. Based on an outcome of applying the predictive model to the values of the event parameters, the one or more computers may further perform the operation of determining an expected occurrence of an additional event during a second time period. In other aspects, the additional event may be associated with an additional event parameter, and the second time period may occur after the first time period. The one or more computers may further perform the operation of transmitting data identifying the expected occurrence of the additional event to a communications device. The communications device may be configured to present a representation of the expected occurrence to a user through an interface.

In some aspects, the one or more computers may further perform the operation of receiving a portion of the digital video content from the one or more video cameras, and the one or more video cameras comprising at least one of a pan-zoom-tilt video camera or a camera having a fixed field-of-view. In other aspects, the one or more computers further perform the operation of receiving a portion of the digital video content from a video management system.

Additionally, in certain aspects, the one or more computers further perform the operation of applying one or more video analytics to portions of the digital video content. The applied video analytics may include at least one of an image acquisition process, an object detection process, an object classification process, an object recognition process, an event detection process, or an object tracking process. Further, the step of detecting the events may include, based on an outcome of the applied video analytics, detecting at least one of the events and establishing the value of at least one of the event parameters.

In other aspects, the step of applying predictive model may include applying at least one of a machine learning algorithm or a data mining algorithm to data identifying the values of the event parameters, and establishing the existence of the time-varying pattern based on an outcome of the at least one machine learning algorithm or data mining algorithm. Further, the step of determining may include applying a machine learning algorithm to data identifying the time-varying pattern in the detected events within the first time period and data identifying the second time period, predicting the expected occurrence of the additional event based on the outcome of the machine learning algorithm, and establishing a value for the corresponding additional event parameter based on the outcome of the machine learning algorithm.

The video cameras may also be disposed at corresponding geographic locations, and the detected events may be associated with corresponding ones of the geographic locations. The operations may also include, based on the outcome of applying the predictive model to the values of the event parameters, determining a plurality of expected occurrences of additional events during the second time period. The additional events may be associated with corresponding ones of the geographic locations and corresponding additional event parameters, and transmitting data identifying at least a subset of the expected occurrences to the communications device.

In additional aspects, the operations may also include, based on the outcome of applying the predictive model to the values of the event parameters, determining expected occurrences of a plurality of additional events during the second time period, and transmitting data identifying at least a subset of the expected occurrences to the communications device. The additional events may be associated with corresponding additional event parameters.

In some aspects, the detected events may include at least one of queued individuals, individuals entering a restricted area through a corresponding entrance, or vehicles entering the restricted area through a corresponding entrance, and the event parameters comprise at least one of a number of the queued individuals, a number of the individuals that enter the restricted area through the corresponding entrance, or a number of the vehicles that enter the restricted area through the corresponding entrance. In other aspects, the one or more computers may further perform the operation of receiving a request to obtain the data identifying the expected occurrence of the additional event from the communications device, and the step of transmitting may include transmitting the data identifying the expected occurrence of the additional event in response to the received request. The data may include the value of the additional parameter value.

In other implementations, corresponding computer-implemented methods and computer programs may be configured to perform those steps performed by the example apparatus described above. One or more computer programs can be so configured by virtue of having instructions that, when executed by device, cause the device to perform the actions.

Some implementations of the techniques described herein can, in certain instances, realize one or more of the following advantages. First, a video monitoring system that has limited coverage of a monitored area may leverage previously captured video content to predict occurrences of events at various locations within the monitored area and at various times in the future. Using the predicted occurrences of these events, the video monitoring system, which may include a limited number of video cameras, may allocate the limited numbers of video cameras to adaptively capture the predicted occurrences of these events at their predicted detection times. The predictive capabilities may thus at least somewhat make up for coverage deficiencies that may be present in a smaller and more cost effective video surveillance system. Additionally, these capabilities may facilitate the ability for organizations to rely on more compact surveillance systems that generate less video content, thereby reducing the amount of video content that requires processing, reducing network bandwidth expended in transmitting video content to a management system, and reducing the storage requirements for recorded video content.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a computing system that detects events shown within digital video content captured by one or more video cameras, establishes time-varying trends or patterns among the detected event, and based on the time-varying trends or patterns, predicts an occurrence, or alternatively, a non-occurrence, of a particular event during a future time period. In this specification, an event may correspond to a presence or movement of a particular object, individual, or groups of objects or individuals within portions of the digital video content captured by the one or more video cameras, and examples of detected events include, but are not limited to, a presence within the captured digital video content of queued individuals, individuals or vehicles entering an area monitored by the one or more video cameras through corresponding entrances, and a presence of objects, such as luggage, within an area monitored by the one or more video cameras.

The computing system may, in some aspects, store the digital video content captured by the one or more video cameras at corresponding geographic locations, and apply video analytics to portions of the stored digital video content to detect events shown within the digital video content at corresponding detection times. These detected events may be associated with values of event parameter, e.g., event parameter values, which characterize each of the detected events at corresponding detection times during a first time period. Further, through an application of one or more machine learning algorithms and/or data mining algorithms, the computing system may establish an existence of one or more trends of patterns within the time-varying event parameter values, and generate a model that predicts the expected values of the event parameters during a future time period.

Figure 1:
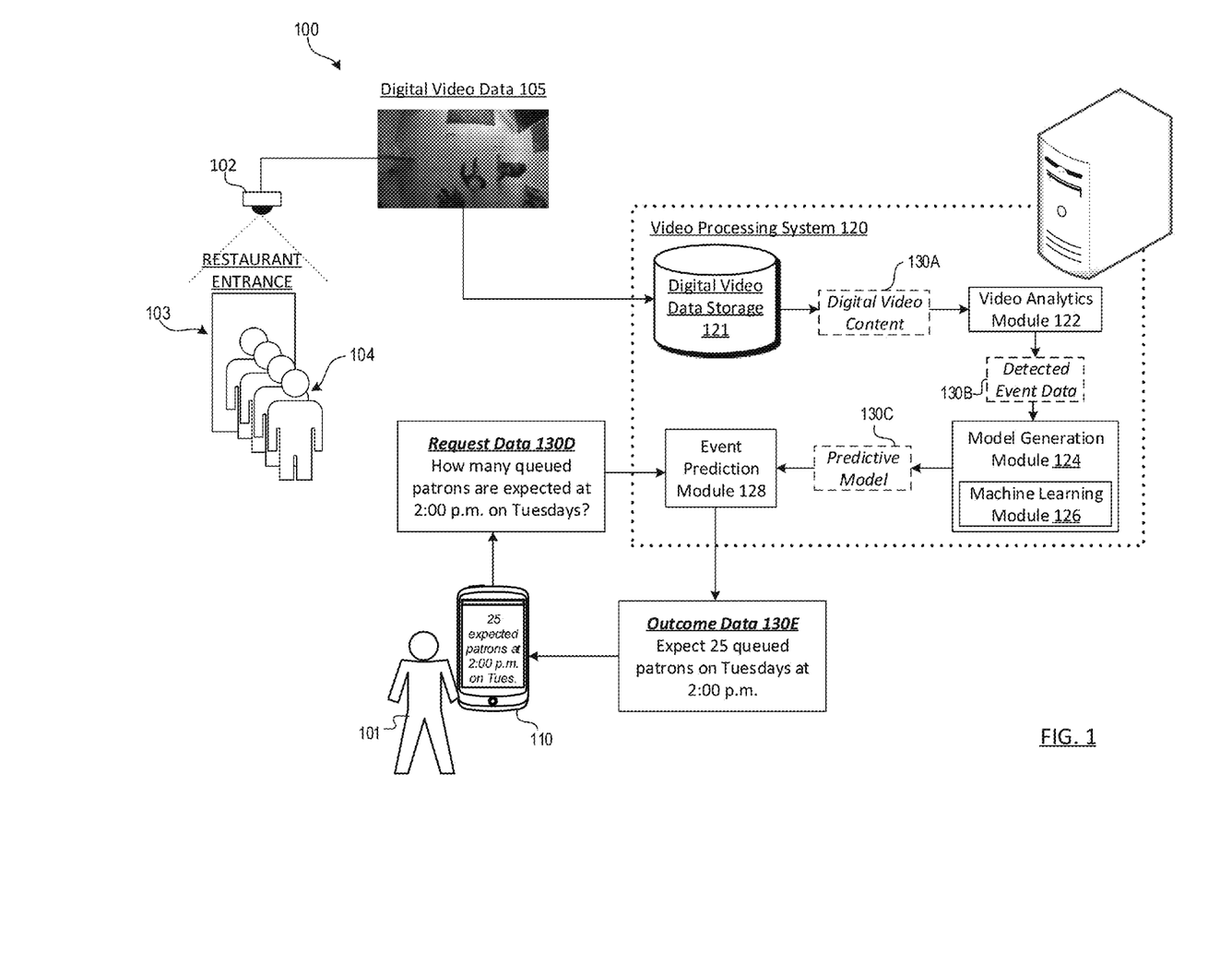
FIG. 1 is a diagram of an environment in which a video processing system predicted occurrences of future events based on prior events detected within captured video content.

FIG. 1 illustrates an example system 100 that analyzes digital video content to detect time-varying occurrences of events and to establish time-varying patterns among event parameter values that characterize the detected events. In some aspects, system 100, includes one or more video cameras, e.g., a video camera 102, a client device 110, and a video processing system 120, which may be interconnected through any appropriate combination of communications networks, e.g., a wireless local area network (LAN), e.g., a "WiFi" network, a RF network, a Near Field Communication (NFC) network, a wireless Metropolitan Area Network (MAN) connecting multiple wireless LANs, and a wide area network (WAN), e.g., the Internet.

In one implementation, the one or more video cameras may be disposed at corresponding locations within a geographic region, and may be configured to capture digital video content indicative of a presence or movement of a particular object, individual, or groups of objects or individuals at each of the corresponding locations. The one or more video cameras may include, but are not limited to, a video camera having a fixed field-of-view, a video camera having variable fields-of-view, as a configurable pan-zoom-tilt (PZT) camera, and a movable video camera, such as dashboard video cameras, body-worn and wearable video cameras, and cameras incorporated within or attached to drones and other manned or unmanned vehicles. In some aspects, the one or more video cameras. In some aspects, the one or more video cameras may be configured to transmit packetized data that includes portions of the captured video content to video processing system 120 across any of the networks described above. The transmitted packetized data may also include data, e.g., global positioning system (GPS) data, that identifies a current location and/or one or more prior locations of the one or more video cameras.

For example, as illustrated in FIG. 1, video camera 102 may be positioned proximate to an entrance 103 of a restaurant, and may be configured to capture a presence and/or movement of one or more customers 104 queued at restaurant entrance 103 and awaiting service at various times throughout the restaurant's operating hours. Video camera 102 may generate digital video content that captures the presence and/or movement of queued customers 104, and may transmit data including portions of the captured digital video content, e.g., digital video data 105, to video processing system 120 across an appropriate one of the communications networks. For instance, video camera 102 may transmit portions of digital video data 105 to video processing system 120 at regular, predetermined intervals or in response to a detection of one or more triggering events, such as when an amount of stored digital video content exceeds a predetermined threshold. Additionally, in some instances, video camera 102 may append data or metadata to digital video data 105 that identifies video camera 102, a time stamp associated with the transmitted portion of the digital video content, and/or a location of video camera 102, e.g., at restaurant entrance 103.

Additionally, in some aspects, video camera 102 may represent a component of a surveillance system, which may include a plurality of video cameras, including video camera 102, disposed at various locations within and outside of the restaurant. The surveillance system may, for example, include a video management system (not depicted in FIG. 1) configured to receive, store, and process portions of the digital video content captured by video camera 102 and one or more of the other video cameras of the surveillance system. For example, the video management system may receive the digital video content captured by video camera 102 and one or more of the other video cameras, and may transmit portions of the captured digital video content to video processing system 120, along with data or metadata identifying the video cameras, time stamps, and/or locations of the video cameras.

In some implementations, video processing system 120 may receive digital video data 105, and may store digital video data 105 within a portion of a locally accessible data repository, such as digital video data storage 121. For example, digital video data 105 may include portions of digital video content captured by video camera 102 during one or more prior time periods, and as described above, may also include data or metadata that identifies video camera 102, one or more time stamps associated with the portions of the digital video content, and/or a location of video camera 102. In some aspects, video processing system 120 may receive portions of digital video data 105 directly from video camera 102 and/or from the one or more additional video cameras. In other aspects, as described above, video processing system 120 may receive portions of digital video data 105 from a video management system associated with a surveillance system, which may receive and process digital video content captured by video camera 102 and/or the additional video cameras prior to transmission to video processing system 120.

Digital video data storage 121 may include structured data records associated with portions of the digital video data received from video camera 102, e.g., digital video data 105, and from the one or more additional video cameras. For example, upon receipt of digital video data 105, video processing system 120 may process digital video data 105 to extract the data or metadata that identifies video camera 102, the time stamp associated with the transmitted portion of the digital video content, and/or the location of video camera 102, which video processing system 120 may include within a corresponding one of the structured data records within digital video data storage 121. Additionally, in some instances, video processing system 120 may store the digital video content captured by video camera 102 within digital video data storage 121, and associate a location of the stored digital video content with the corresponding structured data record. Video processing system 120 may perform similar operations to process and store subsequent portions of digital video data received from video camera 102, and additionally or alternatively, to process and store digital video data received from the one or more additional video cameras. In some aspects, the stored digital video content may establish a time varying record of customer activity at restaurant entrance 103 throughout the restaurant's operating hours, and further, a time varying record of activity monitored by each of the one or more additional video cameras at the corresponding locations.

In some implementations, video processing system 120 may apply one or more video analytics to portions of the digital video content stored within digital video data storage 121, and based on an outcome of the application of the video analytics, detect one or more events shown within the portions of the stored video content. As described above, the detected events may correspond to a presence or movement of a particular object, individual, or groups of objects or individuals within the portions of the stored digital video content, and each of the detected events may be associated with a corresponding detection time and a corresponding detection location. Further, in additional aspects, each of the detected events may be characterized by one or more event parameters, the values of which may be established by video processing system 120 based on the application of the video analytics.

In some aspects, video processing system 120 may obtain, from digital video data storage 121, a portion of the stored digital video content that was captured by video camera 102 at restaurant entrance 103, e.g., digital video content 130A, and a video analytics module 122 may apply the one or more video analytics to digital video content 130 to detect occurrences of certain events, to identify detection times associated with the detected events, and further, to determine event parameter values that characterize the detected events. The applied video analytics may include, but are not limited to, one or more processes for detecting, classifying, recognizing, counting, and/or tracking objects within frames of digital video content 130A, one or more image acquisition processes, and one or more facial- and textual-recognition processes.

For example, based on an application of the one or more processes for detecting, classifying, recognizing, and/or tracking objects to digital video content 130A, video analytics module 122 may detect objects, such as individuals, vehicles, or luggage, occurring within frames of digital video content 130A and further, monitor a trajectory, speed, and travel time of these detected objects as they move within successive frames of digital video content 130A. Further, and based on an application of the one or more object-counting processes to digital video content 130A, video analytics module 122 may determine or "count" numbers of these objects occurring within the frames of digital video content 130A, and additionally or alternatively, a number of these objects that cross virtual lines disposed within the frames of digital video content 130A. Additionally, video analytics module 122 may apply the facial- and textual-recognition algorithms to identify faces of individuals and textual content, such a license plate, within the digital video content 130A. In other implementations, video analytics module may apply any additional or alternate set of video analytics that would be appropriate to the stored digital video content and to video processing system 120.

By way of example, digital video content 130A may include portions of the digital video content captured by video camera 102 at or near restaurant entrance 103 at various times during the restaurant's operating hours, and may also include portions of the stored data or metadata that identify video camera 102, video camera 102's location, and corresponding time stamps of the captured digital video content. Video analytics module 122 may apply the one or more video analytics to digital video content 130A, and based on an outcome of the application of the video analytics, detect a presence of customers 104 queued at restaurant entrance 103 at corresponding detection times throughout the operating hours. Video analytics module 122 may also determine a number of customers queued at restaurant entrance 103 at each of the detection times, and may establish these determined numbers of queued customers as event parameter values that characterize the detected events. In some aspects, video analytics module 122 may generate data indicative of an outcome of the application of the video analytics, e.g., detected event data 130B, that includes, but is not limited to, data identifying the one or more detected events, the corresponding detection times and detection locations, and the one or more established event parameter values.

In some implementations, a model generation module 124 may generate a predictive model that establishes an existence of one or more patterns, e.g., time-varying patterns, within the time-varying event parameter values characterizing the events detected during a prior time period (e.g., a first time period), and based on the established time-varying patterns, predicts an expected occurrence of an additional event at one or more geographic locations during a future time period (e.g., a second time period). By way of example, video processing system 120 may obtain detected event data 130B, which identifies and characterizes events detected by video analytics module 122 within digital video content during the prior time period, and which may include detection times, detection locations, and event parameter values that characterize each of the detected events. Model generation module 124 may, in some instances, receive detected event data 130B as an input, and a machine learning module 126 may apply one or more machine learning algorithms and/or one or more data mining algorithms to the time-varying event parameter values that characterize the detected events during the prior time period, e.g., as included within event data 130B.

Based on an outcome of the application of the machine learning algorithms and/or data mining algorithms to detected event data 130B, machine learning module 126 may establish the existence of the time-varying patterns within portions of the time-varying event parameter values that characterize the events detected at corresponding ones of the geographic locations during the prior time period. In some aspects, machine learning module 126 may identify and establish time-varying patterns within the time-varying event parameter values that characterize events detected within digital video content captured by a single video camera at a corresponding location, such as video camera 102.

By way of example, and based on the outcome of the applied machine learning algorithms and/or data mining algorithms, machine learning module 126 may establish one or more time-varying patterns in the numbers of customers 104 queued at restaurant entrance 103 during the operating hours of the restaurant during the past month. In some instances, the restaurant may be open for business between 11:00 a.m. and 11:00 p.m. on a daily basis, and machine learning module 126 may establish daily time-varying patterns in the number of customers 104 queued at restaurant entrance 103 during portions of the corresponding operating hours. For instance, the daily time-varying patterns may characterize the determined numbers of queued customers 104 at restaurant entrance 103 on certain days and certain times, e.g., the established time-varying pattern may indicate that, on a given Wednesday, the number of queued customers varies from ten at 11:00 a.m. to a local maximum of twenty-five at 1:00 p.m., to a local minimum of six by 3:00 p.m., to a global maximum of thirty-five at 7:00 p.m., to a global minimum of one at 10:30 p.m. In other instances, the daily time-varying patterns may characterize trends in the determined numbers of queued customers 104 at restaurant entrance 103 on certain days and certain times, e.g., that lunch periods from 11:30 a.m. to 12:30 p.m. on Mondays and Fridays are characterized by larger numbers of queued customers 104 than comparable lunch periods on Tuesday and Thursday.

In other aspects, machine learning module 126 may identify and establish time-varying patterns within the time-varying event parameter values that characterize events detected within digital video content captured by multiple video cameras disposed at one or more additional locations, and additionally or alternatively, by a single video camera capable of capturing a presence or motion of individuals or objects disposed at multiple locations, such as one of the PZT cameras described above. For example, and based on the outcome of the applied machine learning algorithms and/or data mining algorithms, machine learning module 126 may establish one or more location-specific, time-varying patterns among the event parameter values that characterize events detected within digital video content captured at each of the corresponding locations.

Model generation module 124 may, in certain aspects, generate the predictive model in accordance with the one or more established time-varying patterns, and may output data, e.g., predictive model data 130C, that specifies the predictive model and reflects the established time-varying pattern or patterns. In some aspects, and as described above, the predictive model may predict an expected occurrence of, and event parameter values that characterize, an additional event at one or more geographic locations during a future time period. For example, the predictive model may accept, as input data, information identifying an additional event, a geographic location, and future time or date, and may generate, as output data, an expected value of one or more event parameters that characterize the occurrence of the additional event at the geographic location and at the future date or time.

Further, in some implementations, video processing system 120 may receive portions of the input data from a communications devices, e.g., communications device 110, across any of the communications networks described above. By way of example, a user of communications device 110, e.g., user 101, may be an owner or manager of the restaurant described above, and in certain aspects, user 101 may provide, via communications device 110, input to a web page or other graphical user interface (GUI) that specifies a request for data characterizing an expected occurrence of an additional event at a geographic location during a future time period. For example, user 101 may provide, as input to communications device 110, data identifying a request for an expected number of queued customers 104 at restaurant entrance 103 at 2:00 p.m. on Tuesday afternoons. Communications device 110 may package portions of the input data to video processing system 120 as a request to obtain the expected number of queued customers 104 at restaurant entrance 103 at 2:00 p.m. on Tuesday afternoons.

Video processing system 120 may receive the transmitted data, e.g., request data 130D, and an event prediction module 128 may access predictive model data 130C, and may apply the predictive model to portions of request data 130D and detected event data 130B. For example, event prediction module 128 may request data 130D, and extract portions of the data that identify the additional event (e.g., a presence of queued customers 104 at restaurant entrance 103), one or more requested event parameter values (e.g., the numbers of queued customers 104 at restaurant entrance 103), the requested geographic location (e.g., restaurant entrance 103) and/or the requested time or date (e.g., Tuesdays at 2:00 p.m.), which may be provided as inputs to the predictive model. In certain aspects, and in response to the application of the predictive model to the portions of request data 130D event prediction module 128 may generate data, e.g., output data 130E, that identifies an expected value of the one or more requested event parameters at the requested geographic location and the requested time and date.

For example, and based on an application of the predictive model to the extracted portions of request data 130D and detected event data 130B, event prediction module 128 may predict that the restaurant should expect twenty-five queued customers at restaurant entrance 103 on Tuesday afternoons at 2:00 p.m., and event prediction module 128 may populate outcome data 130E with the expected number of queued customers 104 at restaurant entrance 103. Video processing system 120 may, in certain aspects, transmit portions of output data 130E to communications device 110 across any of the communications networks described above. For example, the transmitted portions of output data 130E may identify the expected value of the event parameter at the requested location and time or time, e.g., twenty-five customers queued at restaurant entrance 103 on Tuesday afternoons at 2:00 p.m., and communications device 110 may execute one or more applications programs that present a representation of the expected number of queued customers to user 101 through a corresponding interface. For example, communications device 110 may present the representation of the expected number of queued customers to user 101 through a portion of a web page or other graphical user interface (GUI), and additionally or alternatively, through a voice-user interface (VUI) that may leverage a virtual digital assistance functionality of communications device 110.

Additionally, in some implementations, communications device 110 may additionally perform operations upon receipt of data identifying the expected value of the external event parameter. By way of example, the expected value of the event parameter, e.g., the expectation of twenty-five queued customers at restaurant entrance 103 on Tuesday afternoons at 2:00 p.m., may exceed an anticipated value and may thus be inconsistent with a prior allocation of resources by user 101, e.g., the larger-than-expected number of queued customers may indicate that the restaurant will serve a larger-than-expected number of meals on Tuesdays at 2:00 p.m. In certain aspects, communications device 110 may execute one or more application programs that, either independently or in conjunction with other external computing systems (e.g., associated with various vendors), adaptively and automatically adjust the allocation of resources to match the expected attendance. For instance, the executed application programs may perform operations that re-allocate human resources, such as wait staff and kitchen staff, and further, may re-allocate or adjust scheduled deliveries to the restaurant to account for the larger-than-expected number of customers on Tuesday afternoons.

Figure 2:
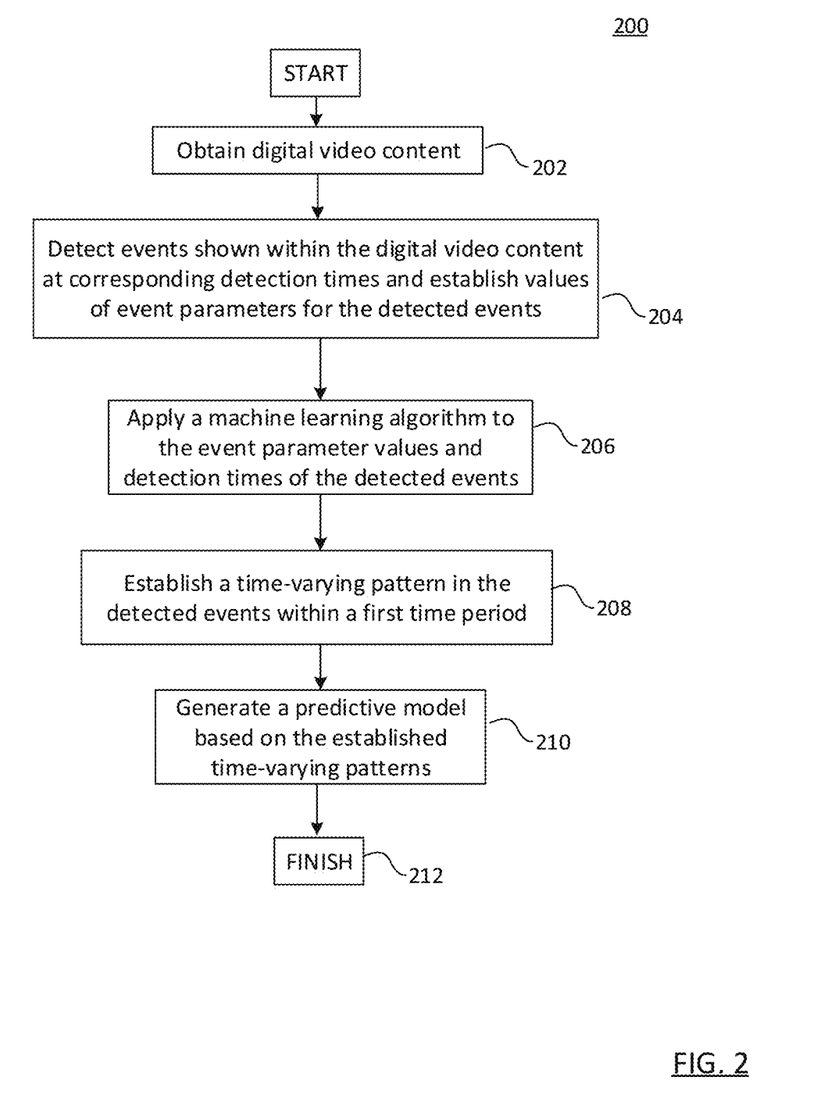
FIG. 2 is a flowchart of an example process for generating a predictive model based on events detected within captured digital video content.

FIG. 2 is a flowchart 200 of an example process for establishing a predictive model based on events detected within digital video content. In certain aspects, a computing system, e.g., video processing system 120, may perform the steps of example process 200. For example, video processing system 120 may perform operations that detect events occurring within portions of digital video content captured by one or more video cameras during a prior time period (e.g., a first time period), apply one or more machine learning algorithms and/or one or more data mining algorithms to event parameter values that characterize the detected events during the first time period, and based on an outcome of the applied machine learning and/or data mining algorithms, establish one or more patterns within the time-varying event parameter values, e.g., time-varying patterns, and generate a model that predicts the expected values of the event parameters during a future time period in accordance with the one or more established time-varying patterns.

In some aspects, video processing system 120 may obtain digital video content captured by one or more video cameras at corresponding locations during one or more time periods (e.g., in step 202). For example, and as described above, video processing system may receive and store digital video data within corresponding portions of a data repository, such as digital video data storage 121 of FIG. 1. In some aspects, video processing system 120 may access digital video data storage 121 and in step 202, may obtain portions of the stored digital video data that correspond to digital video content captured by a subset of the one or more video cameras, e.g., video camera 102, at corresponding ones of the locations during the one or more time periods.

Video processing system 120 may also perform operations that detect events that occur within the obtained digital video content, and establish values of event parameters that characterize the detected events (e.g., in step 204). For example, video processing system 120 may apply one or more of the video analytics described above to the obtained digital video content, and based on an outcome of the application of the video analytics, may detect certain events occurring at corresponding detection times and detection locations within the digital video content and establish event parameter values that characterize these detected events using any of the processes described above. Further, in some instances, video processing system 120 may generate data indicative of an outcome of the application of the video analytics, e.g., detected event data, that includes, but is not limited to, data identifying the detected events, the corresponding detection times and detection locations, and the established event parameter values.

In some aspects, the detected events may include, but are not limited to, a presence within the captured digital video content of queued individuals, a presence or movement of individuals and/or vehicles into and within a restricted or unrestricted area through corresponding entrances, and a presence or movement of objects, such as luggage, within a particular area. Further, in additional aspects, the event-parameter values that characterize these detected events may include a number of the queued individuals, a location of the queued individuals, a number of individuals or vehicles entering the restricted or unrestricted area, and a location, speed, and/or trajectory of the objected within the particular areas. For example, and as described above, video processing system 120 may detect a presence of queued customers at a particular entrance of a restaurant at various detection times during the restaurant's operating hours (e.g., a detected event), and the established event parameter values may specify a number of queued customers at each of the detection times during the restaurant's operating hours.

Video processing system 120 may also apply one or more machine learning algorithms and additionally or alternatively, one or more data mining algorithms, to the event parameter values that characterize the detected events during the prior time period or time periods (e.g., in step 206). For example, video processing system 120 may access portions of the detected event data, which identify the detected events, the corresponding times and locations of detection, and the event parameter values that characterize these detected events at the corresponding detection times, and may apply the one or more machine learning and data mining algorithms to the accessed portions of the detected event data using any of the processes described above.

Based on an outcome of the application of the machine learning algorithms and/or data mining algorithms to the detected event data, video processing system 120 may establish an existence of one or more time-varying trends within portions of the event parameter values that characterize the events detected at corresponding ones of the geographic locations during the prior time period. In some aspects, machine learning module 126 may identify and establish time-varying patterns within the time-varying event parameter values that characterize events detected within digital video content captured by a single video camera at a corresponding location, such as video camera 102. In other aspects, machine learning module 126 may identify and establish time-varying patterns within the time-varying event parameter values that characterize events detected within digital video content captured by multiple video cameras disposed at one or more additional locations, and additionally or alternatively, by a single video camera capable of capturing a presence or motion of individuals or objects disposed at multiple locations, such as one of the PZT cameras described above.

By way of example, the detected event data may identify a number of customers queued at the restaurant entrance at corresponding detection times throughout the restaurant's operating hours on a daily basis, and based on the application of the machine learning and/or data mining algorithms to the detected event data, video processing system may establish daily, time-varying patterns in the number of customers queued at the restaurant entrance during portions of the corresponding operating hours using any of the processes described above. For instance, the daily time-varying patterns may characterize the numbers of queued customers at restaurant entrance on certain days and certain times and additionally or alternatively, may characterize observed trends in the numbers of queued customers at the restaurant entrance over certain days, times, and/or time periods.

In additional aspects, video processing system 120 may generate one or more predictive models in accordance with the one or more established time-varying patterns, and may output data, e.g., predictive model data, that specifies the predictive model and reflects the established time-varying pattern or patterns. In some aspects, and as described above, the predictive model may predict an expected occurrence of, and event parameter values that characterize, an additional event at one or more geographic locations during a future time period. For example, the predictive model may accept, as input data, information identifying an additional event, a geographic location, and future time or date, and may generate, as output data, an expected value of one or more event parameters that characterize the occurrence of the additional event at the geographic location at the future date or time. Exemplary process 200 may then be complete in step 212.

In some implementations, video processing system 120 may continue to receive and store digital video data captured by the one or more video cameras. For example, video camera 102 may generate digital video content that captures a presence of customers 104 queued at restaurant entrance 103 at various times during prior operating hours of a restaurant (e.g., 11:00 a.m. to 11:00 p.m. daily), and video camera 102 may transmit portions of the digital video content to video processing system 120. Using any of the processes described above, video processing system 120 may apply video analytics to the digital video content to detect events occurring within the digital video content at corresponding detection times, e.g., a presence of queued customers 104 at restaurant entrance 103, and establish event parameter values that specify the number of customers queued at the restaurant entrance at each of the corresponding detection times. As described below in reference to FIG. 3, video processing system 120 apply the predictive model to the event parameter values of the detected events and the corresponding detection times (and additionally or alternatively, detection locations), and based on an outcome of the predictive model, determine an expected number of queued customers 104 at restaurant entrance 103 during a future time period.

Figure 3:
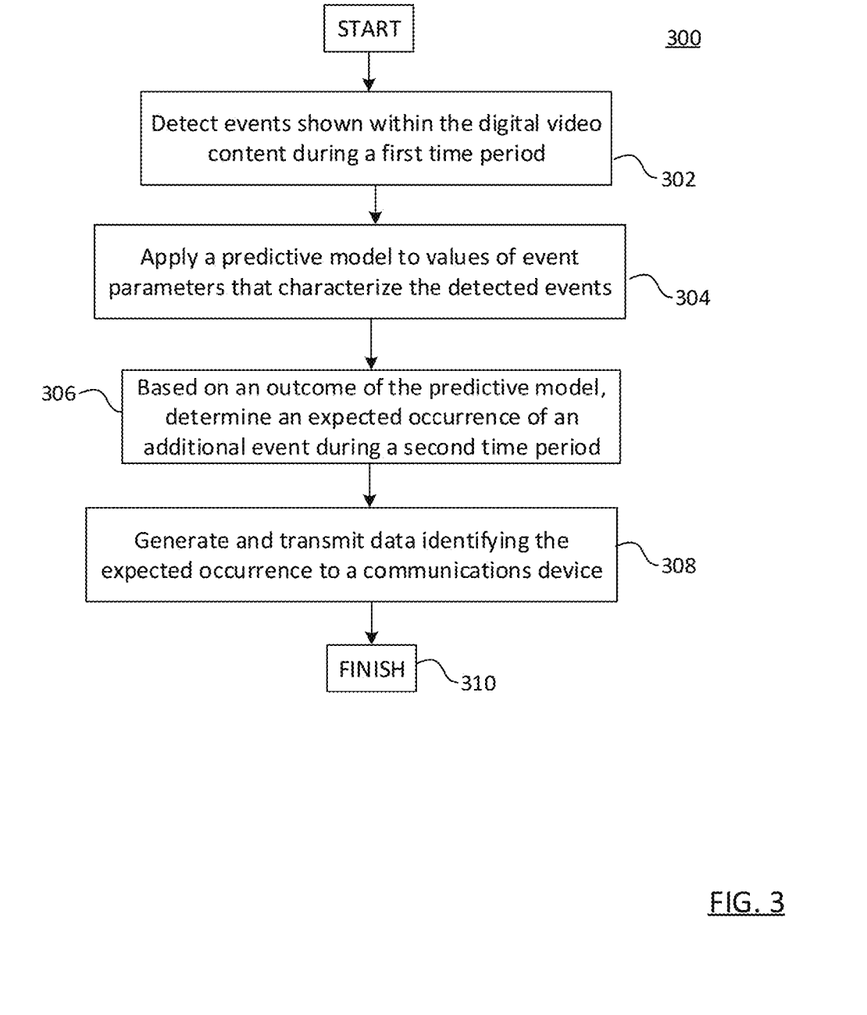
FIG. 3 is a flowchart of an example process for predicting an occurrence of a future event based on prior events detected within captured digital video content.

FIG. 3 is a flowchart of an exemplary process 300 for predicting an expected occurrence of one or more events during a future time period based on events detected within digital video content captured during one or more prior time periods. In certain aspects, a computing system, e.g., video processing system 120, may perform the steps of example process 300. For example, video processing system 120 may perform operations that detect events occurring within portions of digital video content captured by one or more video cameras during one or more prior time periods (e.g., a first time period), apply a predictive model to time-varying event parameter values that characterize the detected events, and based on an outcome of the application of the predictive model, determine an expected occurrence of one or more additional events within a future time period (e.g., a second time period).

Video processing system 120 may, in some instances, obtain digital video content captured by one or more video cameras at corresponding locations during one or more prior time periods. For example, and as described above, video processing system may receive and store digital video data within corresponding portions of a data repository, such as digital video data storage 121 of FIG. 1. In some aspects, video processing system 120 may access digital video data storage 121 may obtain portions of the stored digital video data that correspond to digital video content captured by a subset of the one or more video cameras, e.g., video camera 102, at corresponding ones of the locations during the one or more time periods, e.g., at restaurant entrance 103.

In certain aspects, video processing system 120 may perform operations that detect events that occur within the obtained digital video content at corresponding detection times during the one or more prior time periods, and establish one or more event parameter values and detection locations that characterize each of the detected events (e.g., in step 302). For example, video processing system 120 may apply one or more of the video analytics described above to the obtained digital video content, and based on an outcome of the application of the video analytics, may detect certain events occurring at the corresponding detection times and establish event parameter values and detection locations that characterize these detected events using any of the processes described above. Further, in some instances, video processing system 120 may generate data indicative of an outcome of the application of the video analytics, e.g., detected event data, that includes, but is not limited to, data identifying the detected events, the corresponding detection times and detection locations, and the established event parameter values.

The detected events may include, but are not limited to, a presence within the captured digital video content of queued individuals, a presence or movement of individuals and/or vehicles into and within a restricted or unrestricted area through corresponding entrances, and a presence or movement of objects, such as luggage, within a particular area. Further, in additional aspects, the event-parameter values that characterize these detected events may include a number of the queued individuals, a location of the queued individuals, a number of individuals or vehicles entering the restricted or unrestricted area, and a location, speed, and/or trajectory of the objected within the particular areas. For example, and as described above, video processing system 120 may detect a presence of queued customers at a particular entrance of a restaurant at various detection times during the restaurant's operating hours (e.g., a detected event at a corresponding detection location), and the established event parameter values may specify a number of queued customers at each of the detection times during the restaurant's operating hours.

Additionally, video processing system 120 may access a predictive model that establishes one or more time-varying patterns within the event parameter values that characterize the events detected at corresponding ones of the geographic locations during the prior time period or periods, and that predicts an expected occurrence of, and event parameter values that characterize, an additional event at one or more geographic locations during a future time period. In some aspects, video processing system 120 may apply the predictive model to portions of the detected event data and additionally or alternatively, to input data specifying the additional event, the one or more geographic locations and/or one or more particular times during the future time period (e.g., in step 304). Based on an outcome of the predictive model, video processing system 120 may determine an expected value of the one or more event parameters that characterize the additional event at the one or more specified geographic locations and/or particular times during the future time period (e.g., in step 306).

By way of example, and as described above, the detected event data may specify numbers of customers queued at the restaurant's entrance at various detection times during the restaurant's operating hours during the prior time period (e.g., a prior month). Additionally, and using any of the processes described above, video processing system 120 may generate the predictive model based on one or more time-varying patterns in the numbers of the customers queued at the restaurant's entrance throughout the restaurant's operating hours. Further, and as described above, one or more of the established time-varying patterns may represent a daily time-varying pattern, which may be indicative of a pattern in the numbers of the customers queued at the restaurant's entrance throughout the restaurant's operating hours on specific prior days (e.g., every Tuesday during the prior time period, etc.).

Additionally, in certain aspects, video processing system 120 may receive portions of the input data from a communications devices, e.g., communications device 110, across any of the communications networks described above. By way of example, a user of communications device 110, e.g., user 101, may be an owner or manager of the restaurant described above, and in certain aspects, user 101 may provide, via communications device 110, input to a web page or other graphical user interface (GUI) that specifies a request for data characterizing an expected occurrence of an additional event at a geographic location during a future time period. For example, user 101 may provide, as input to communications device 110, data identifying a request for an expected number of queued customers at the restaurant's entrance at 2:00 p.m. on Tuesday afternoons. Communications device 110 may package portions of the input data to video processing system 120 as a request to obtain the expected number of queued customers at the restaurant's entrance 103 at 2:00 p.m. on Tuesday afternoons.

Video processing system 120 may receive the transmitted data, e.g., request data, and extract portions of the request data that identify the additional event (e.g., a presence of the queued customers at the restaurant's entrance), one or more requested event parameter values (e.g., the numbers of queued customers at restaurant entrance), the requested geographic location (e.g., the restaurant's entrance) and/or the particular time or date (e.g., Tuesdays at 2:00 p.m.), which may be provided as inputs to the predictive model, e.g., in step 304. In certain aspects, and in response to the application of the predictive model to the portions of the request data and the detected event data, video processing system 120 may determine the expected value of the one or more event parameters that characterize the additional event at the geographic locations and particular time and date (e.g., in step 306). For example, in step 306, video processing system 120 may determine that the restaurant should expect twenty-five queued customers at restaurant entrance 103 on Tuesday afternoons at 2:00 p.m.

In some aspects, video processing system 120 may generate output data that identifies the expected value of the one or more event parameters that characterize the additional event at the one or more geographic locations and particular times and dates, and may transmit portions of the generated output data to communications device 110 across any of the communications networks described above (e.g., in step 308). For example, the transmitted portions of the output data may identify the expected value of the event parameter at the particular location and time, e.g., twenty-five customers queued at the restaurant's entrance on Tuesday afternoons at 2:00 p.m., and communications device 110 may execute one or more applications programs that present a representation of the expected number of queued customers to user 101 through a corresponding interface. For example, communications device 110 may present the representation of the expected number of queued customers to user 101 through a portion of a web page or other graphical user interface (GUI), and additionally or alternatively, through a voice-user interface (VUI) that may leverage a virtual digital assistance functionality of communications device 110. Exemplary process 300 may then be complete in step 310.

As described above, video processing system 120 may generate a predictive model that identifies one or more time-varying patterns within the event parameter values that characterize the events detected at one or more geographic locations during one or more prior time period or periods, and that predicts an expected occurrence of, and event parameter values that characterize, an additional event at the one or more geographic locations during a future time period. For example, and as described above, video processing system 120 may establish the one or more time-varying patterns based on an application of one or more machine learning and/or data mining algorithms to the time-varying event parameter values that characterize events detected within digital video content at corresponding detection times within the prior time period.

In additional implementations, video processing system 120 may input labelled training data into the predictive model at predetermined intervals or in response to particular events (e.g., a variance between predicted and actual event parameters exceeds a threshold variance) to facilitate supervised or unsupervised learning, which may refine and improve an accuracy of the predictive model. For example, and as described above, video processing system 120 may predict that twenty-five customers will queued the restaurant's entrance, e.g., restaurant entrance 103, at 2:0 p.m. on Tuesday afternoons. In some aspects, video processing system 120 may receive, e.g., from user 101 via communications device 110 and/or from one or more third-party computing systems, data indicating the nineteen customers were actually queued in line at the restaurant's entrance on Tuesday, May 24, 2016, at 2:00 p.m., and determine that the expected number of queued customers at 2:00 p.m. on May 24th exceeds the actual number of queued customers by six customers, i.e., 24% of the expected number.

In some aspects, video processing system 120 may provide data identifying the detected event, the corresponding geographic location, time and/or date, and the actual and expected event parameter values (e.g., an expectation of twenty-five customers queued at the restaurant's entrance and nineteen actual queued customers) to the predictive model as training data. For example, video processing system 120 may apply the one or more machine learning algorithms to the training data to generate additional output that refines the time-varying patterns and improves the accuracy of the predictive model.

In certain implementations described above, video processing system 120 may detect events shown within digital video content captured by one or more video cameras, and based on established time-varying trends or patterns, predict an occurrence, or alternatively, a non-occurrence, of an additional event during a future time period. For example, and as described above, video processing system 120 may receive digital video content captured by a video camera, e.g., video camera 102, disposed proximate to an entrance of a restaurant, e.g., restaurant entrance 102. Using any of the processes described above, video processing system 120 may detect numbers of customers queued at restaurant entrance 103 at corresponding detection times within the digital video content, and may predict expected numbers of customers queued at restaurant entrance 103 at various times in the future.

In other aspects, video processing system 120 may also be configured to receive data indicative of occurrences of one or more additional events, and to correlate the occurrences of the detected events and the one or more additional events. By way of example, video processing system 120 may be in communication with one or more sensors across any of the communications networks described above, and may receive sensor data captured by these one or more sensors at predetermined intervals or in response to specified triggering events. For instance, the one or more sensors may include a temperature sensor, which transmits data identifying detected temperatures, e.g., additional events, to video processing system 120 at predetermined intervals. Using any of the processes described above, video processing system 120 may identify patterns within the data identifying the time-varying numbers of queued customers at restaurant entrance 103 (e.g., the detected events) and the time-varying temperatures (e.g., the additional events) within a prior time period, and may predict expected numbers of queued customers occurring during a future time period that experiences a specific temperature or range of temperatures.

In additional aspects, video processing system 120 may receive portions of the additional event data from one or more external computing systems, such as computing systems maintained by various organizations, governmental entities, third-party or business entities, etc. For example, these external computing systems may include, but are not limited to, a traffic-light management system maintained by a transportation department of a local government and an emergency response system maintained by a local fire and rescue department, and video processing system 120 may receive data identifying an external event from one or more of these external computing systems, such as data identifying a time-varying activity of a crosswalk indicator proximate to restaurant entrance 103 and/or time-varying occurrences of emergency calls in a region that includes the restaurant, at predetermined intervals or in response to specified triggering events. Using any of the processes described above, video processing system 120 may identify patterns within the data identifying the time-varying numbers of queued customers at restaurant entrance 103 (e.g., the detected events) and the additional events during a prior time period, and may predict expected numbers of queued customers occurring in conjunction with the one or more additional events during a future time period.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including video analytics module 122, model generation module 124, machine learning module 126, and event prediction module 128, can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification and Appendix can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification and Appendix can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification and Appendix, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
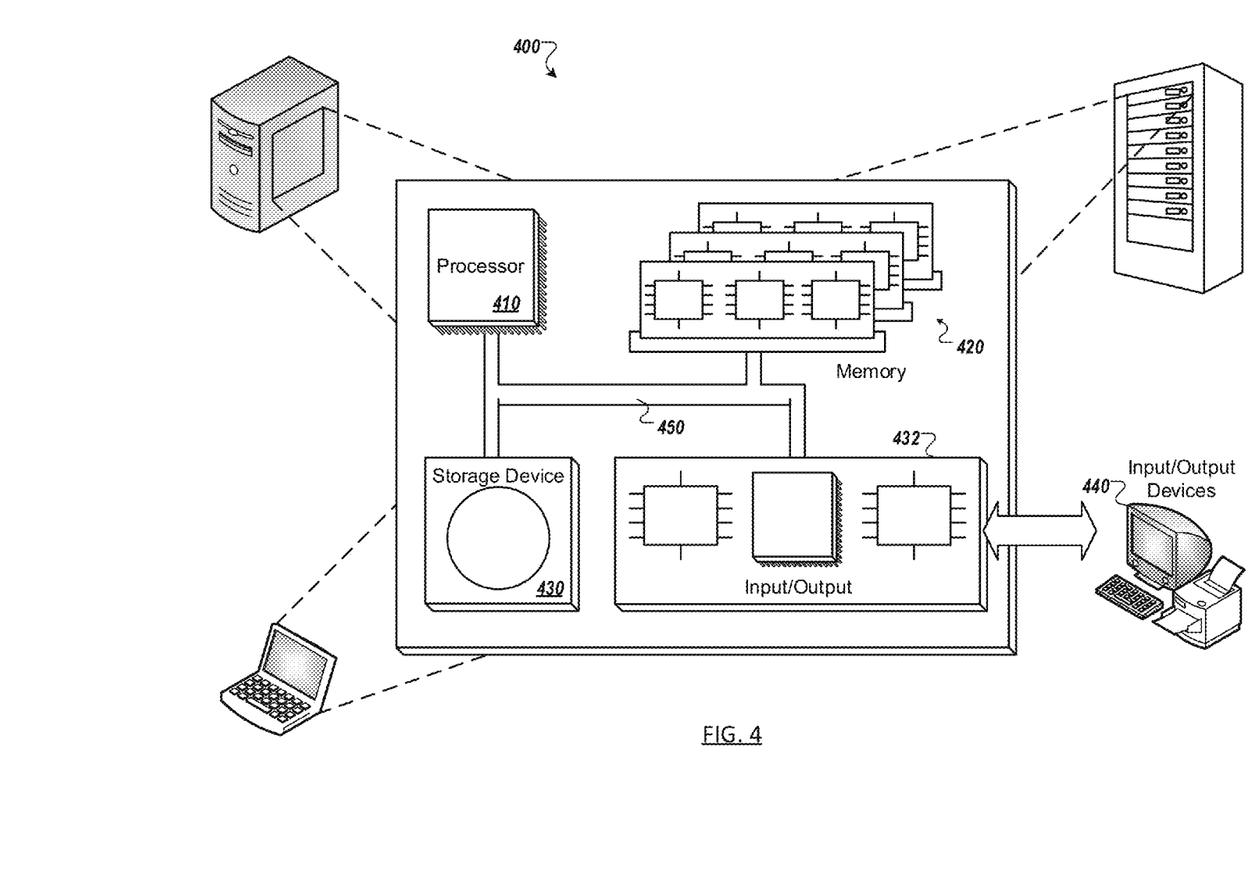
FIG. 4 is a diagram of an example computing system that may perform one or more of the disclosed computer-implemented processes.

An example of one such type of computer is shown in FIG. 4, which shows a schematic diagram of a generic computer system 400. The system 400 can be used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output module 432 includes hardware or hardware and software for interfacing system 400 with the input/output device 440 or other devices or interfaces.

Further, for situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonym ized so that no personally identifiable information can be determined for the user, or a user's geographic location may be generalized where location information is obtained, e.g., to a city, zip code, or state level, so that a particular location of a user cannot be determined. Thus, the user may have control over how information is collected about him or her and used by a content server.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A system, comprising:
one or more computers; and
one or more storage devices storing instructions that, when executed by the one or more computers, cause the one or more computers to perform operations comprising:
detecting events shown within image frames of digital video content captured by one or more video cameras, the detected events being associated with corresponding event parameters and detection times within a first time period, wherein the video cameras are disposed at corresponding geographic locations and the detected events are associated with corresponding ones of the geographic locations;
applying a predictive model that includes a machine learning algorithm to values of the event parameters, the predictive model identifying a time-varying pattern in the detected events within the first time period;
based on an outcome of applying the predictive model to the values of the event parameters, determining a plurality of expected occurrences of additional events during a second time period, the additional events being associated with corresponding ones of the geographic locations and corresponding additional event parameters, and the second time period occurring after the first time period; and
transmitting, over a data communications network, data identifying at least a subset of the expected occurrences of the additional events to a communications device having a display, the communications device being configured to present a representation of each expected occurrence in the subset to a user through an interface of the display.

2. The system of claim 1, wherein:
the one or more computers further perform the operation of receiving a portion of the digital video content from the one or more video cameras; and
the one or more video cameras comprise at least one of a pan-zoom-tilt video camera or a camera having a fixed field-of-view.

3. The system of claim 1, wherein the one or more computers further perform the operation of receiving a portion of the digital video content from a video management system.

4. The system of claim 1, wherein the one or more computers further perform the operation of applying one or more video analytics to portions of the digital video content, the applied video analytics comprising at least one of an image acquisition process, an object detection process, an object classification process, an object recognition process, an event detection process, or an object tracking process.

5. The system of claim 4, wherein detecting the events comprises, based on an outcome of the applied video analytics, detecting at least one of the events and establishing the value of at least one of the event parameters.

6. The system of claim 1, wherein applying predictive model comprises:

applying at least one of the machine learning algorithm or a data mining algorithm to data identifying the values of the event parameters; and establishing the existence of the time-varying pattern based on an outcome of the at least one machine learning algorithm or data mining algorithm.

7. The system of claim 1, wherein the determining comprises:

applying the machine learning algorithm to data identifying the time-varying pattern in the detected events within the first time period and data identifying the second time period; and predicting the expected occurrence of the additional event based on the outcome of the machine learning algorithm; and establishing a value for the corresponding additional event parameter based on the outcome of the machine learning algorithm.

8. The system of claim 1, wherein the operations further comprise:

based on the outcome of applying the predictive model to the values of the event parameters, determining expected occurrences of a plurality of additional events during the second time period, the additional events being associated with corresponding additional event parameters; and transmitting data identifying at least a subset of the expected occurrences to the communications device.

9. The system of claim 1, wherein:

the detected events comprise at least one of queued individuals, individuals entering a restricted area through a corresponding entrance, or vehicles entering the restricted area through a corresponding entrance; and the event parameters comprise at least one of a number of the queued individuals, a number of the individuals that enter the restricted area through the corresponding entrance, or a number of the vehicles that enter the restricted area through the corresponding entrance.

10. The system of claim 1, wherein:

the one or more computers further perform the operation of receiving a request to obtain the data identifying the expected occurrence of the additional event from the communications device, the request identifying at least one time during the second time period;

the determining comprises determining the expected occurrence of an additional event at the at least one time during the second time period; and the transmitting comprises transmitting the data identifying the expected occurrence of the additional event in response to the received request, the data comprising the value of the additional parameter value.

11. A computer-implemented method, comprising:

detecting, by at least one processor, events shown within image frames of digital video content captured by one or more video cameras, the detected events being associated with corresponding event parameters and detection times within a first time period, wherein the video cameras are disposed at corresponding geographic locations and the detected events are associated with corresponding ones of the geographic locations;

applying, by the at least one processor, a predictive model that includes a machine learning algorithm to values of the event parameters, the predictive model identifying a time-varying pattern in the detected events within the first time period;

based on an outcome of applying the predictive model to the values of the event parameters, determining, by the at least one processor, a plurality of expected occurrences of additional events during a second time period, the additional events being associated with corresponding ones of the geographic locations and corresponding additional event parameters, and the second time period occurring after the first time period; and transmitting, by the at least one processor and over a data communications network, data identifying at least a subset of the expected occurrences of the additional events to a communications device having a display, the communications device configured to present a representation of each expected occurrence in the subset to a user through an interface of the display.

12. The method of claim 11, wherein:

the method further comprises receiving a portion of the digital video content from the one or more video cameras; and the one or more video cameras comprise at least one of a pan-zoom-tilt video camera or a camera having a fixed field-of-view.

13. The method of claim 11, further comprising applying one or more video analytics to portions of the digital video content, the applied video analytics comprising at least one of an image acquisition process, an object detection process, an object classification process, an object recognition process, an event detection process, or an object tracking process.

14. The method of claim 13, wherein detecting the events comprises, based on an outcome of the applied video analytics, detecting at least one of the events and establishing the value of at least one of the event parameters.

15. The method of claim 11, wherein applying the predictive model comprises:

applying at least one of the machine learning algorithm or a data mining algorithm to data identifying the values of the event parameters; and establishing the existence of the time-varying pattern based on an outcome of the at least one machine learning algorithm or data mining algorithm.

16. The method of claim 11, wherein the determining comprises:

applying the machine learning algorithm to data identifying the time-varying pattern in the detected events within the first time period and data identifying the second time period; and based on the outcome of the machine learning algorithm, predicting the expected occurrence of the additional event and establishing a value for the corresponding additional event parameter.

17. The method of claim 11, wherein:

the detected events comprise at least one of queued individuals, individuals entering a restricted area through a corresponding entrance, or vehicles entering the restricted area through a corresponding entrance; and the event parameters comprise at least one of a number of the queued individuals, a number of the individuals that enter the restricted area through the corresponding entrance, or a number of the vehicles that enter the restricted area through the corresponding entrance.

18. One or more non-transitory computer-readable media storing instructions that, when executed by at least one processor of a client device, cause performance of operations comprising:

detecting events shown within image frames of digital video content captured by one or more video cameras, the detected events being associated with corresponding event parameters and detection times within a first time period, wherein the video cameras are disposed at corresponding geographic locations and the detected events are associated with corresponding ones of the geographic locations;

applying a predictive model that includes a machine learning algorithm to values of the event parameters, the predictive model identifying a time-varying pattern in the detected events within the first time period;

based on an outcome of applying the predictive model to the values of the event parameters, determining a plurality of expected occurrences of additional events during a second time period, the additional events being associated with corresponding ones of the geographic locations and corresponding additional event parameters, and the second time period occurring after the first time period; and transmitting, over a data communications network, data identifying at least a subset of the expected occurrences of the additional events to a communications device having a display, the communications device configured to present a representation of each expected occurrence in the subset to a user through an interface of the display.

\* \* \* \* \*